United States Patent
Oatridge et al.

(10) Patent No.: US 8,334,474 B1
(45) Date of Patent: Dec. 18, 2012

(54) ONE-SIDED SPOT WELDING DEVICE UTILIZING WORKPIECE HOLDING ELECTROMAGNET AND METHOD OF USE THEREOF

(75) Inventors: Michael Oatridge, Birmingham, AL (US); Ricky Dalton, Talladega, AL (US)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/750,802

(22) Filed: Mar. 31, 2010

(51) Int. Cl.
*B23K 9/12* (2006.01)

(52) U.S. Cl. .................. 219/86.9; 219/86.22; 228/44.3

(58) Field of Classification Search ............... 219/78.01, 219/78.3, 86.1, 86.22, 86.23, 86.25, 86.32, 219/86.9, 89; 228/44.3, 44.5, 44.7
See application file for complete search history.

(56) References Cited

U.S. PATENT DOCUMENTS

| | | | |
|---|---|---|---|
| 1,976,552 A | 10/1934 | Friesen | |
| 2,137,909 A | 11/1938 | Hagedorn | |
| 2,232,450 A | 2/1941 | Hagedorn | |
| 2,233,526 A | 3/1941 | Hagedorn et al. | |
| 2,272,968 A | 2/1942 | Dyer | |
| 2,824,212 A | 2/1958 | Roberts | |
| 3,089,020 A | 5/1963 | Hurlebaus | |
| 3,435,184 A | 3/1969 | Schroeppel et al. | |
| 3,462,577 A | 8/1969 | Helms et al. | |
| 4,418,264 A | 11/1983 | Thorwarth | |
| 4,910,376 A | 3/1990 | Riley et al. | |
| 6,459,064 B1 | 10/2002 | Trubert | |
| 7,378,624 B2 | 5/2008 | Powell | |

FOREIGN PATENT DOCUMENTS

| | | |
|---|---|---|
| DE | 3214788 A1 | 10/1983 |
| JP | 7-256466 A | 10/1995 |
| JP | 8-206849 A | 8/1996 |
| JP | 9-174252 A | 7/1997 |
| SU | 969481 A | 10/1982 |

*Primary Examiner* — Tucker Wright
(74) *Attorney, Agent, or Firm* — Standley Law Group LLP

(57) ABSTRACT

A one-sided spot welding device having a concentrically arranged weld electrode assembly and an electromagnet for clamping together and holding metallic parts during a one-sided spot welding process. A device of the present invention may include a mounting base having a central weld electrode and an outer, concentrically arranged weld electrode extending therefrom. The outer weld electrode may surround or partially surround the central electrode, with some gap therebetween. The central electrode is associated with an actuator that is provided to press a tip of the central weld electrode against a metal component to be welded. An electromagnet resides between the central and outer weld electrodes of the electrode assembly to draw metal components into tight abutting contact and to hold the components in contact with the outer weld electrode during welding.

22 Claims, 4 Drawing Sheets

ONE-SIDED SPOT WELDING DEVICE UTILIZING WORKPIECE HOLDING ELECTROMAGNET AND METHOD OF USE THEREOF

BACKGROUND OF THE INVENTIVE FIELD

The present invention is directed to a one-sided spot welding device and its method of use. More specifically, the present invention is directed to a one-sided spot welding device having an electromagnet to draw together and hold workpieces during a one-sided spot welding process.

Spot welding is a widely used and widely recognized technique for joining various metallic metal parts. More specifically, spot welding is a resistance welding technique that operates by applying welding current and clamping force to a small area ("spot") of the parts to be welded. By so concentrating the welding current and force, heat generated by the welding current quickly melts the parts at the welding spot—rendering them joined upon removal of the welding current and a cooling of the parts.

Spot welding not only requires sufficient current to melt the materials to be joined, but also requires that sufficient pressure be exerted to maintain contact between the parts at the welding spot during the application of the welding current. To this end, various spot welding devices have been designed and used over the years. One common type of spot welding device is a multi-axis welding robot equipped with a spot welding gun, but other types also exist. A spot welding gun commonly comprises two gun arms between which the parts to be welded are clamped from opposite sides during welding. Clamping pressure is commonly provided by moving one or both the gun arms around a pivot axis by means of a pneumatic, electric or hydraulic cylinder. Electric current is passed from one gun arm weld electrode to the other—through the parts to be welded. Resistance to the transfer of electric current causes a buildup of heat, which temporarily melts the parts at the welding spot and leads to their joining.

Spot welding is widely used in the assembly of vehicles, such as automobiles. For example, spot welding is commonly employed to join various sections of an automobile body (e.g., side panels to a roof panel, etc.) In modern automobile construction, spot welding is also used to create "stack-ups" of sheet metal panels. Stack-ups are generally areas of body panels (e.g., door panels) where two or more pieces of sheet metal are stacked together and welded to produce reinforced areas in the resulting automobile body. The materials used in such stack-ups are often of dissimilar thickness and/or composition.

It can be readily understood by one skilled in the art that automobile bodies and other products that are manufactured using spot welding are often of complex shape. It can also be readily understood by one skilled in the art that the shape, size, and or orientation of certain components during manufacture can make it difficult if not impossible to properly locate a spot welding gun thereto. Further, the creation of stack-ups and other spot welding operations that require the insertion of a welding gun arm into the interior of a vehicle body or other structure also pose problems of access when using traditional spot welding techniques.

As a result of the foregoing problems, a considerable interest has developed in one-sided spot welding—that is, spot welding where the electric welding current is passed through the parts to be welded from only a single side. While the ability to perform one-sided spot welding is desirable, the ability to perform such welding has proven problematic.

One particular problem with one-sided spot welding relates to the difficulty in applying sufficient clamping force to the parts to be welded when welding from only one side. More specifically, the clamping force exerted on the parts to be welded during a one-sided spot welding process must generally be substantially commensurate with that of a common two-sided welding process in order to ensure proper part positioning and conductive contact. Consequently, with no gun arm or similar force-applying element pushing back from one side of the parts to be welded, providing an acceptable level of clamping force between a stack-up or other arrangement of parts to be welded can be difficult or impossible.

Therefore, an improved method of performing one-sided spot welding with the ability to adequately clamp together the parts to be welded is needed. The device and method of the present invention satisfies this need.

SUMMARY OF THE GENERAL INVENTIVE CONCEPT

The present invention is directed to a one-sided spot welding device having an electromagnet for clamping together and holding metallic parts and its use to weld such parts during a one-sided spot welding process. A spot welding device of the present invention typically includes a mounting base having a concentrically arranged weld electrode assembly.

The central weld electrode of the electrode assembly may be, for example, a positive electrode. The central electrode may have a shaped weld tip. When the central weld electrode is a positive electrode, the outer weld electrode of the electrode assembly may be a negative electrode, as explained in more detail below. The outer electrode may be of annular or semi-annular shape and is concentrically arranged around the central electrode with a gap or an insulating material therebetween. The central electrode is associated with an actuator that is provided to press the weld tip thereof against a metal component to be welded.

An annular or semi-annular electromagnet resides between the central and outer weld electrodes of the electrode assembly. During operation, the electromagnet draws a pair (or more) of metal components (e.g., sheets) into tight abutting contact and holds the upper metal sheet in contact with the outer electrode.

With the electromagnet energized and the metal sheets and outer electrode held as described above, the actuator is activated to press the weld tip of the central electrode against the upper metal sheet. Preferably, the actuator exerts a pressing force that is less than the force of attraction produced by the electromagnet, such that the central electrode does not dislocate the metal sheets from the outer electrode, and the outer electrode remains tightly held against the upper metal sheet during the welding process.

After clamping by the electromagnet and pressing of the central weld electrode against the upper metal sheet, welding current is supplied through the central weld electrode to spot weld the metal sheets, thereby forming a welded workpiece. Once the spot welding operation is complete, the welding current is turned off, the electromagnet is de-energized, and the spot welding device may be removed from the workpiece.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1b is a bottom view of the one-sided spot welding device of FIG. 1a; and

DETAILED DESCRIPTION OF EXEMPLARY EMBODIMENT(S)

Figure 1A:
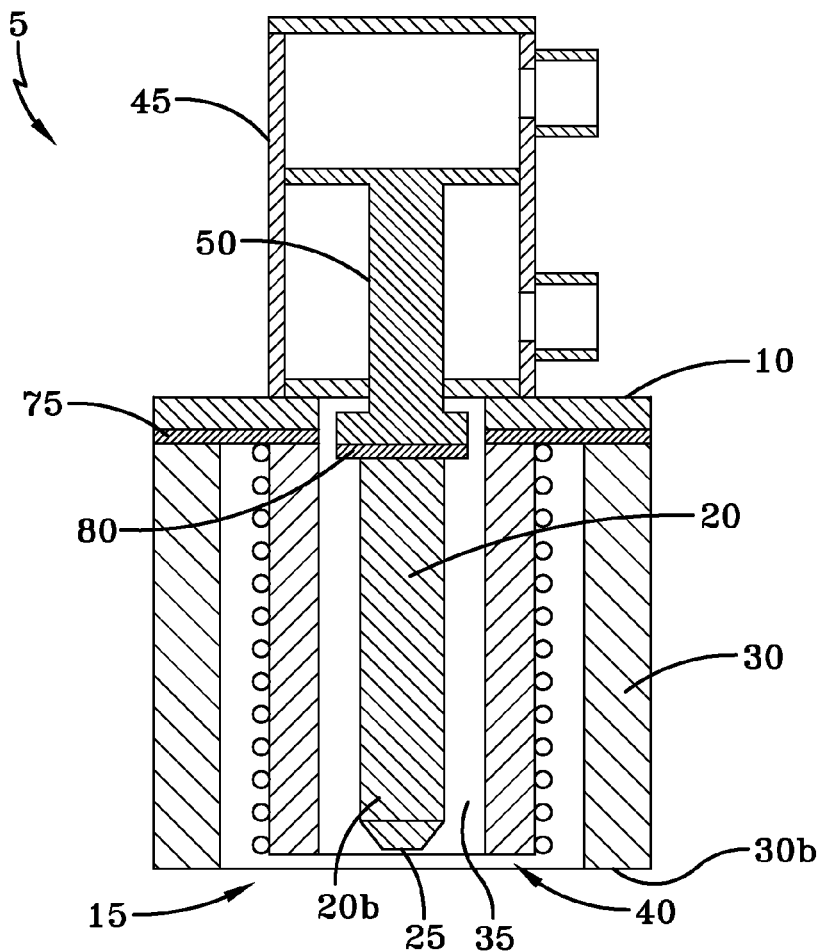
FIG. 1a is a side view of one exemplary embodiment of a one-sided spot welding device of the present invention.
Figure 1B:
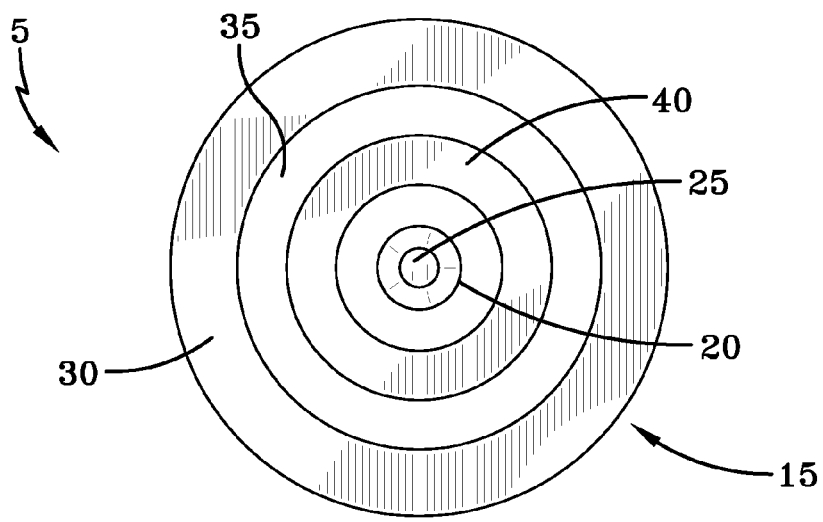

One exemplary embodiment of a one-sided spot (i.e., resistance) welding device 5 (hereafter "device") of the present invention is illustrated in FIGS. 1a-1b. Such a device may be constructed as a hand-held unit, or such a device may be designed for installation to a spot welding robot.

The device is shown to include a mounting base 10 to which is attached a concentrically arranged weld electrode assembly 15 and an electromagnet 40. The mounting base 10 may be of various designs as needed for a particular application, and may be constructed from various materials. Preferably, the mounting base 10 is made from a material that exhibits little to no reaction to the magnetic field produced by the electromagnet 40. An electrode actuator 45 is also provided, the purpose of which is described in more detail below.

The electrode assembly 15 can be seen to include a central weld electrode 20 that is surrounded (or partially surrounded in other embodiments) by an outer weld electrode 30. The weld electrodes 20, 30 are preferably manufactured from a highly conductive material that also preferably exhibits good heat dissipation. In the particular exemplary embodiment shown and described herein, the central weld electrode 20 is a positive electrode and the outer weld electrode 30 is a negative electrode. It should be realized, however, that in other DC-powered versions of a welding device of the present invention, the arrangement of weld electrodes may be reversed such that the central weld electrode is a negative electrode and the outer weld electrode is a positive electrode. Further, it may also be possible to produce an AC-powered version of a welding device of the present invention, wherein the aforementioned electrode polarity may not apply.

The central weld electrode 20 of this particular welding device 5 is preferably cylindrical in shape, although other shapes may also be possible. A distal end 20b of the central weld electrode 20 forms a weld tip 25 for contacting a part to be welded during a spot welding operation. The weld tip 25 may be shaped to better concentrate the welding current supplied to the device 5 so as to produce a proper spot weld.

The outer weld electrode 30 of the weld device 5 is annular in shape and concentrically arranged to surround or partially surround the central weld electrode 20, with some gap 35 therebetween. In other embodiments of the present invention, the air gap between the electrodes may be replaced with an electrically insulating material.

While the outer weld electrode 30 is shown to be of annular shape in this exemplary embodiment, it is to be understood that the outer weld electrode of other embodiments may be semi-annular (arcuate) in nature. That is, the outer weld electrode of a one-sided spot welding device of the present invention is not necessarily required to form a complete ring (i.e., be fully annular in cross-section). The contact surface area 30b of the outer weld electrode 30 is preferably provided to be less than 10× (ten times) the contact surface area defined by the weld tip 25 (or other workpiece contacting portion) of the central weld electrode 20, so as to produce a high density current under the central weld electrode during a spot welding operation.

An annular electromagnet 40 is concentrically arranged within the gap 35 between the central and outer weld electrodes 20, 30. While the electromagnet 40 is shown to be of annular shape in this exemplary embodiment, it is to be understood that, like the outer weld electrode 30, an electromagnet of other embodiments may be semi-annular (arcuate) in nature. That is, the electromagnet of a one-sided spot welding device of the present invention is not necessarily required to form a complete ring (i.e., be fully annular in cross-section) as long as the electromagnet is capable of exerting a sufficient attractive force.

The electromagnet 40 is attached to the mounting base 10 and preferably remains insulated from the outer weld electrode 30. This insulation may result from the gap 35 shown, or from the use of an insulating material. An electrically insulating plate 75 may also be located between the mounting plate 10 and the electromagnet 40. The insulating plate 75 may also reside between the mounting plate 10 and the outer weld electrode 30.

Figure 2A:
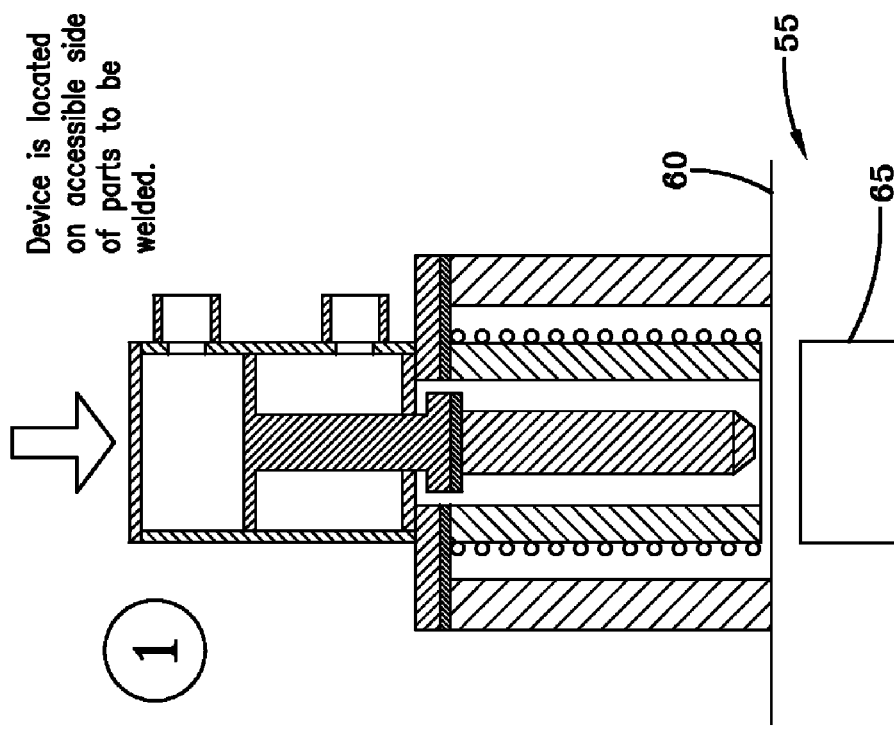
FIG. 2 illustrates various steps of using a one-sided spot welding device of the present invention to form a workpiece by spot welding two sheets of metal.
Figure 2B:
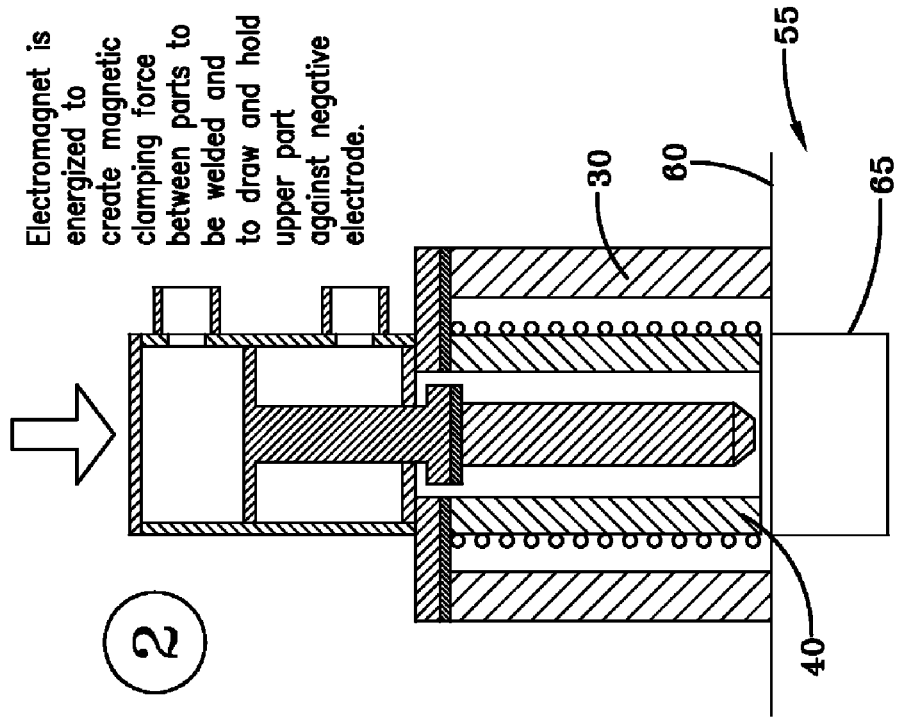
Figure 2D:
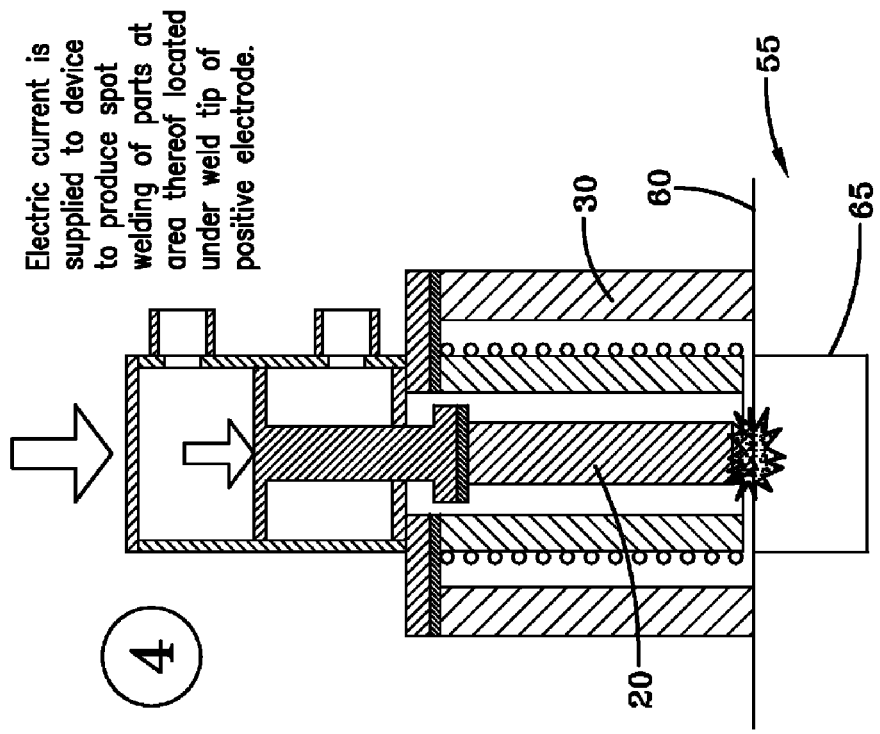
Figure 2C:
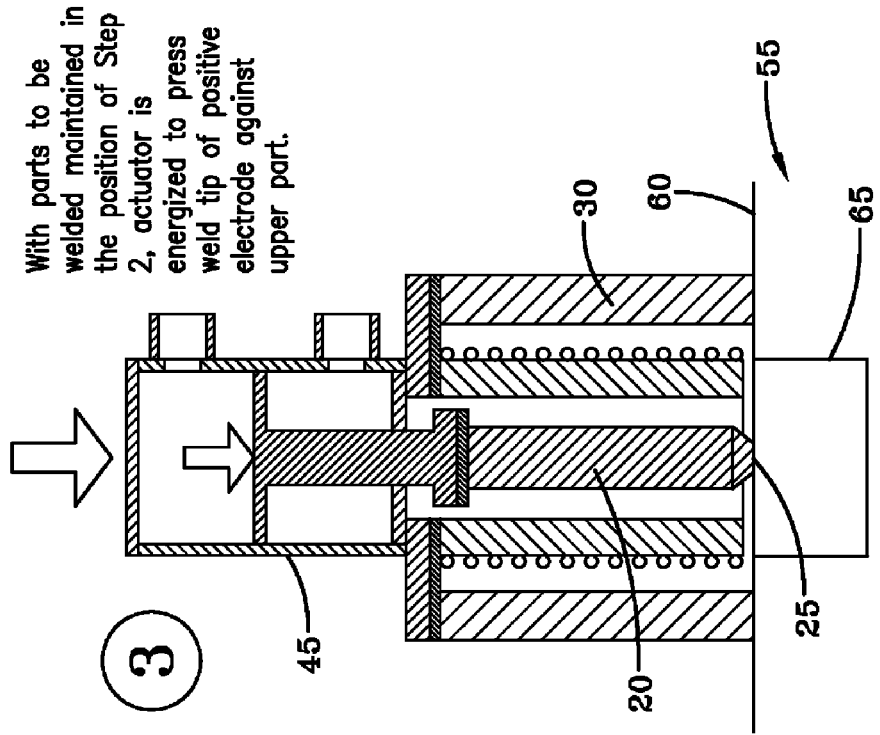
Figure 2F:
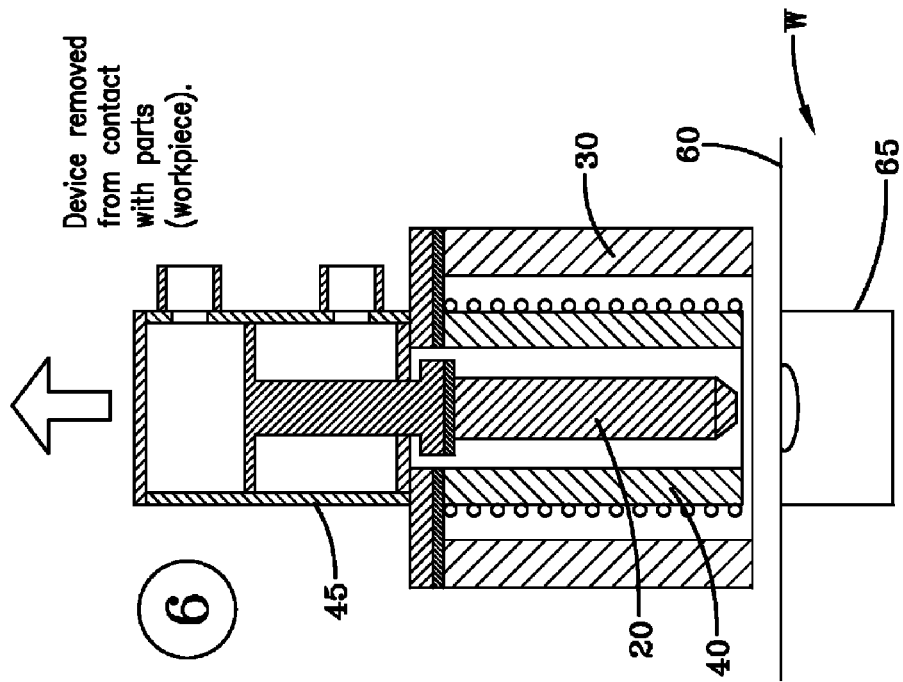
Figure 2E:
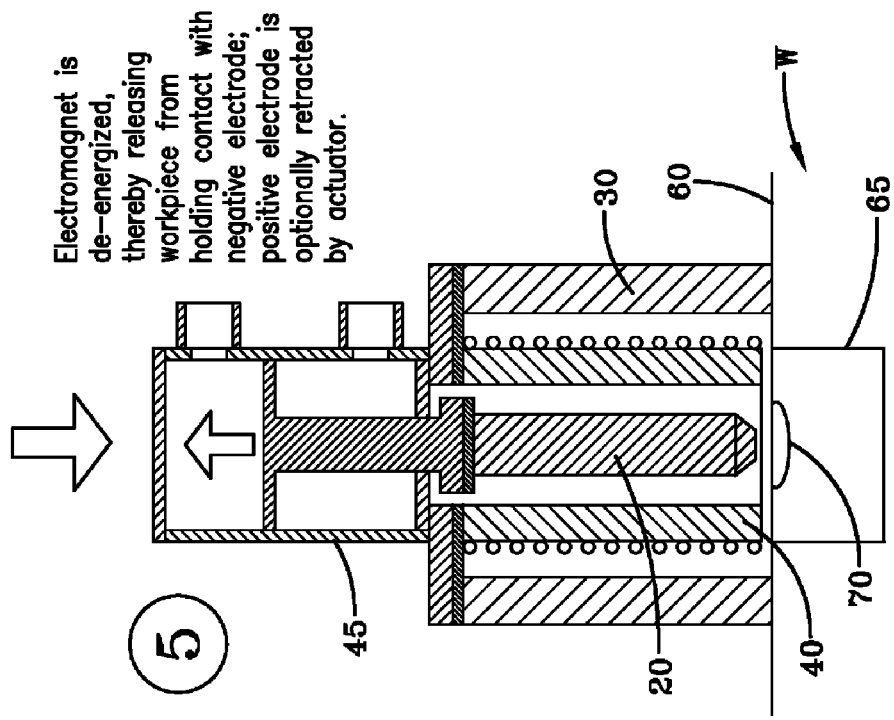

The electromagnet 40 is provided to draw two or more metal sheets (or other thin metal components) into tight abutting contact and to hold the upper sheet (or component) in contact with the outer electrode 30 during welding (see, e.g., FIG. 2b). The size, shape and force of the electromagnet 40, as well as the gaps (or insulating material) between the electromagnet and the central and outer weld electrodes 20, 30 may be selected to ensure that the force of the electromagnet is sufficient to hold the metal sheets to be welded without causing a deformation thereof.

The device 5 also includes an electrode actuator 45. The electrode actuator 45 is associated with the mounting base and is connected to the central weld electrode 20 to press the central weld electrode against an upper metal component to be welded during a spot welding operation. More particularly, in this exemplary embodiment, the central weld electrode 20 is mounted to a piston 50 of the electrode actuator 45 such that the central weld electrode may be moved toward and away from an arrangement of metal components to be welded when the device 5 is placed in a welding position with respect thereto. An electrically insulating plate 80 may be located between the piston 50 of the electrode actuator 45 and the central electrode 20.

When the electrode actuator of a device of the present invention differs in construction from the electrode actuator 45 shown and described herein, the central weld electrode may be mounted to whatever component thereof is appropriate to move the central weld electrode toward and away from an arrangement of metal components to be welded. Preferably, the electrode actuator 45 (or at least the moving components thereof) is made from a material that exhibits little to no reaction to the magnetic field produced by the electromagnet 40.

In this particular embodiment, the electrode actuator 45 is a pneumatic cylinder. However, it should be apparent to one skilled in the art that other actuators could be used in lieu of a pneumatic cylinder. For example, an electrode actuator of the present invention may include a hydraulic cylinder, an electric cylinder, etc. A servo actuator, such as would be familiar to one of skill in the art, may serve well for this purpose.

Use of the device 5 to perform an exemplary spot welding operation is illustrated by Steps 1-6 of FIG. 2. As depicted in Step 1, the device 5 is first located to an arrangement of parts to be spot welded. In this particular exemplary the parts 60, 65 are a stack-up of metal sheets 55 that, once welded together, form a composite workpiece W. Thus, although the lower part 65 is shown as being box-like in shape for purposes of clarity in the illustrations of FIG. 2, the lower part 65 will commonly be a substantially flat metal sheet similar to the flat metal sheet 60 that is the upper part. Of course, as would be understood by one of skill in the art, the individual parts to be welded may actually be of dissimilar shape and, whether of similar or dissimilar shape, may be of different thicknesses. The present invention is not limited to use with similar metal sheets.

As shown in Step 2, once the device 5 is properly located to the stack-up of metal sheets 55 the electromagnet 40 is energized. A separate power source may be provided to energize the electromagnet. Alternatively, it may be possible to energize the electromagnet using electric current derived from the main welding current supply.

In either case, energization of the electromagnet 40 causes the upper part 60 to be drawn upward and held in tight contact with the outer weld electrode 30. Additionally, the lower part 65 is also drawn upward and into tightly held contact with the upper part 60. The strength of the electromagnet is preferably selected to be capable of maintaining the parts in a proper part-to-part positional relationship, as well as in sufficient conductive contact to effectuate proper flow of a later applied welding current. In other words, the clamping force produced by the electromagnet 40 substantially replaces the clamping force typically produced by the gun arms of a common spot welding gun.

The strength of the electromagnet 40 is also preferably selected to be capable of properly holding the clamped parts to the device 5 by pressed contact of the upper part 60 to the outer weld electrode 30. The strength of the electromagnet 40 is also preferably sufficient to perform the aforementioned clamping/holding functions while not deforming one or more of the parts to be welded. Consequently, the strength of an electromagnet used in the present invention may be selected based on the parts to be welded, the materials and/or thicknesses of each part, and one or more other factors that would we well understood by one of skill in the art.

With the electromagnet 40 energized and the stack-up of metal sheets 55 clamped/held thereby as described above, the electrode actuator 45 is activated to press the weld tip 25 of the central weld electrode 20 against the upper metal sheet 60. The contact force produced by the electrode actuator 45 should be sufficient to ensure good conductive contact between the central weld electrode 20 and the upper metal sheet 60, but should be less than the attractive force exerted by the electromagnet 40 to avoid dislodging the stack-up of metal sheets 55 from the outer weld electrode 30.

As illustrated in Step 4, electric welding current may then be supplied to the device 5 to produce a spot welding of the upper sheet 60 and lower sheet 65 at the area thereof underlying the weld tip 25 of the central weld electrode 20. As would be understood by one of skill in the art, this forms a weld nugget 70 between the sheets 60, 65 and produces a joining thereof. Weld current may be supplied by any of various devices and by any technique known in the art. For example, the supply of welding current may be controlled by a weld timer. The magnitude of the welding current may be commensurate with the particular parts being welded.

As depicted in Step 5, once the actual spot welding function has been completed, the flow of welding current is terminated, and the electromagnet 40 may be de-energized to release the workpiece W from holding contact with the outer weld electrode 30. The central weld electrode 20 may then be optionally retracted by the electrode actuator 45 prior to removal of the device 5 from the workpiece W (as shown in Step 6). Alternatively, the device 5 may be removed from the workpiece W prior to or concurrently with retraction of the central weld electrode 20 by the electrode actuator 45 to reduce cycle time.

From the foregoing description of an exemplary one-sided spot welding device of the present invention and an exemplary use thereof, it can be understood that a device of the present invention allows for metal parts to be successfully joined by welding from one side. It can also be understood that a device and method of the present invention facilitates a one-sided spot welding process wherein concerns regarding access to both sides of a part assembly to be welded are eliminated.

While certain embodiments of the present invention are described in detail above for the purpose of illustrating the present invention, it should be realized that alterations of the specific design shown can be made while still falling within the scope of the overall invention. For example, and without limitation, the inner and outer electrodes of such a device may have a cross-sectional shape that is other than annular or arcuate (e.g., square or rectangular). Consequently, the scope of the present invention is not to be considered limited by such disclosures, and modifications are possible without departing from the spirit of the invention as evidenced by the following claims:

What is claimed is:

1. A one-sided spot welding device, comprising:
   a mounting base;
   a concentrically arranged electrode assembly extending from said mounting base, said electrode assembly including a central weld electrode and an outer weld electrode, said central weld electrode being separated and insulated from said outer weld electrode;
   an electromagnet concentrically located between said central weld electrode and said outer weld electrode, said electromagnet provided to magnetically clamp together two or more parts to be welded and to hold said parts to be welded against said outer weld electrode while in said clamped arrangement; and
   an actuator associated with said central weld electrode, said actuator provided to move said central weld electrode toward and away from a part to be welded and to press a distal end of said central weld electrode against a part to be welded during a welding operation.

2. The one-sided spot welding device of claim 1, wherein said central weld electrode is a positive electrode and said outer electrode is a negative electrode.

3. The one-sided spot welding device of claim 1, wherein said central weld electrode is of circular cross-section.

4. The one-sided spot welding device of claim 1, wherein said central weld electrode has a weld tip at a distal end thereof, said weld tip shaped to concentrate a welding current supplied to said device.

5. The one-sided spot welding device of claim 1, wherein said outer weld electrode is of annular cross-section.

6. The one-sided spot welding device of claim 1, wherein said outer weld electrode is of semi-annular cross-section.

7. The one-sided spot welding device of claim 1, wherein a contact surface area of said outer weld electrode is less than ten times the contact surface area of said central weld electrode.

8. The one-sided spot welding device of claim 1, wherein said electromagnet is of annular cross-section.

9. The one-sided spot welding device of claim 1, wherein said electromagnet is of semi-annular cross-section.

10. The one-sided spot welding device of claim 1, wherein said central electrode is separated from said outer electrode by an air gap.

11. The one-sided spot welding device of claim 1, wherein said central electrode is separated from said outer electrode by an electrically insulating material.

12. The one-sided spot welding device of claim 1, wherein said actuator is selected from the group consisting of a pneumatic cylinder, a hydraulic cylinder, an electric cylinder and a servo actuator.

13. The one-sided spot welding device of claim 1, wherein said actuator is adapted to exert a pressing force that is less than a magnetic force of attraction produced by said electromagnet.

14. A one-sided spot welding device for welding metal parts residing in a stacked arrangement, comprising:
   a mounting base;
   a positive weld electrode of circular cross-section extending from said mounting base;
   a negative weld electrode of annular cross-section extending from said mounting base, said negative weld electrode concentrically arranged to surround said positive weld electrode with a gap residing therebetween;
   an electromagnet of annular cross-section extending from said mounting base, said electromagnet concentrically arranged to surround said positive weld electrode and located within said gap between said positive weld electrode and said negative weld electrode, said electromagnet provided to magnetically clamp together two or more parts to be welded by drawing a lower part against an upper part, and to hold said parts to be welded against a bottom surface of said negative weld electrode while said parts remain in a clamped arrangement; and
   an actuator associated with said mounting base and connected to said positive weld electrode, said actuator adapted to move said positive weld electrode toward and away from an arrangement of metal parts to be welded and to press a distal end of said positive weld electrode against an upper part of said arrangement of metal parts to be welded while said metal parts are held against said negative electrode during a welding operation.

15. The one-sided spot welding device of claim 14, wherein said positive weld electrode has a weld tip at a distal end thereof, said weld tip shaped to concentrate a welding current supplied to said device.

16. The one-sided spot welding device of claim 14, wherein a contact surface area of said negative weld electrode is less than ten times the contact surface area of said positive weld electrode.

17. The one-sided spot welding device of claim 14, wherein said actuator is selected from the group consisting of a pneumatic cylinder, a hydraulic cylinder, an electric cylinder, and a servo actuator.

18. The one-sided spot welding device of claim 14, wherein said actuator is adapted to exert a pressing force that is less than a magnetic force of attraction produced by said electromagnet.

19. The one-sided spot welding device of claim 14, further comprising an electrically insulating material located in said gap between said positive weld electrode and said negative weld electrode.

20. A one-sided spot welding method for joining metal parts residing in a stacked arrangement, comprising:
   (a) providing a one-sided spot welding device, said one-sided spot welding device further comprising:
      a mounting base, a positive weld electrode of circular cross-section extending from said mounting base,
      a negative weld electrode of annular cross-section extending from said mounting base, said negative weld electrode concentrically arranged to surround said positive weld electrode with a gap therebetween,
      an electromagnet of annular cross-section extending from said mounting base, said electromagnet concentrically arranged to surround said positive weld electrode and located within said gap between said positive weld electrode and said negative weld electrode, and
      an actuator associated with said mounting base and connected to said positive weld electrode, said actuator adapted to move said positive weld electrode toward and away from an arrangement of metal parts to be welded;
   (b) placing said one-sided spot welding device in contact with an upper metal part of a stack of metal parts;
   (c) energizing said electromagnet of said one-sided spot welding device to magnetically clamp together said metal parts by drawing a lower metal part(s) against said upper metal part, and to hold said metal parts against a bottom surface of said negative weld electrode while said parts remain in a clamped arrangement;
   (d) activating said actuator to press a distal end of said positive weld electrode against said upper metal part while said metal parts are held against said negative electrode;
   (e) supplying an electric current to said one-sided spot welding device, said electric current producing a spot welding of said metal parts at a location underlying said positive weld electrode;
   (f) terminating the supply of electric current to said one-sided spot welding device;
   (g) de-energizing said electromagnet of said one-sided spot welding device to release said metal parts from contact with said negative electrode; and
   (h) removing said one-sided spot welding device from said metal parts.

21. The method of claim 20, wherein said metal parts are a stack-up of metal sheets.

22. The method of claim 21, further comprising using said actuator to retract said positive electrode from contact with said upper metal part prior to removal of said one-sided spot welding device therefrom.

* * * * *